(12) United States Patent
Satou et al.

(10) Patent No.: US 9,109,639 B2
(45) Date of Patent: Aug. 18, 2015

(54) CLUTCH DEVICE

(71) Applicant: KABUSHIKI KAISHA F.C.C., Shizuoka (JP)

(72) Inventors: Tomoyasu Satou, Hamamatsu (JP); Shinji Furuhashi, Hamamatsu (JP); Norikazu Takeda, Hamamatsu (JP); Kenichirou Isobe, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 14/358,110

(22) PCT Filed: Nov. 13, 2012

(86) PCT No.: PCT/JP2012/079337
§ 371 (c)(1),
(2) Date: May 14, 2014

(87) PCT Pub. No.: WO2013/073515
PCT Pub. Date: May 23, 2013

(65) Prior Publication Data
US 2015/0041275 A1  Feb. 12, 2015

(30) Foreign Application Priority Data

Nov. 17, 2011 (JP) ................. 2011-251174

(51) Int. Cl.
*F16D 13/56* (2006.01)
*F16D 13/71* (2006.01)
*F16D 13/40* (2006.01)
*F16D 13/52* (2006.01)

(52) U.S. Cl.
CPC ............. *F16D 13/40* (2013.01); *F16D 13/52* (2013.01); *F16D 13/56* (2013.01); *F16D 13/71* (2013.01); *F16D 2013/565* (2013.01)

(58) Field of Classification Search
None
See application file for complete search history.

(56) References Cited

U.S. PATENT DOCUMENTS

| | | | | |
|---|---|---|---|---|
| 5,090,543 A | * | 2/1992 | Takeuchi | 464/64.1 |
| 2009/0071789 A1 | * | 3/2009 | Kataoka et al. | 192/87.12 |
| 2009/0071792 A1 | * | 3/2009 | Kataoka et al. | 192/93 R |
| 2011/0192699 A1 | * | 8/2011 | Yazaki et al. | 192/70.12 |

FOREIGN PATENT DOCUMENTS

| | | |
|---|---|---|
| JP | 61096222 | 5/1986 |
| JP | 61149618 | 7/1986 |
| JP | 2011153655 | 8/2011 |

* cited by examiner

*Primary Examiner* — Rodney H Bonck
(74) *Attorney, Agent, or Firm* — Michael Tobias

(57) ABSTRACT

A clutch device is provided which facilitates an operation of checking whether or not spring seats have been properly disposed and effectively prevents falling off or a change in attitude of the spring seats, thereby reducing the labor required for manufacture. A clutch device 100 includes a pressure plate 110 which presses friction plates 103 which are rotationally driven by a drive shaft against clutch plates 107. The pressure plate 110 includes clutch springs 112 and spring seats 113 disposed in receiving portions 111 having a concave shape. Each spring seat 113 has two plate-shaped arms 113a and 113b extending along the bottom 111a of the receiving portion 111 and has a C-like shape. Protrusions 114a and 114b project from the peripheries of the arms 113a and 113b. Recesses 111b into which the protrusions 114a and 114b fit are formed in an inner wall portion of each receiving portion 111 at a position near the bottom 111a of the receiving portion 111.

7 Claims, 6 Drawing Sheets

(a)

(b)

(c)

CLUTCH DEVICE

TECHNICAL FIELD

The present invention relates to a clutch device which transfers rotational drive force from a drive shaft rotationally driven by a prime mover to a driven shaft for driving a driven body and interrupts the transfer.

BACKGROUND ART

Conventionally, a vehicle, such as a two-wheel vehicle or a four-wheel car, includes a clutch device which is disposed between a prime mover such as an engine and a driven body such as a wheel. The clutch device transfers rotational drive force from the prime mover to the driven body and interrupts the transfer. In general, a clutch device includes friction plates which are rotated by rotational drive force of a prime mover and clutch plates connected to a driven body. Each of the friction plates faces a corresponding one of the clutch plates. Transfer of rotational drive force and interruption of the transfer can be performed at will by bringing the friction plates and the clutch plates into a tightly coupled state or a separated state.

The friction plates and the clutch plates are brought into the tightly coupled state by pressing a pressure plate against a friction plate or clutch plate. For example, below-listed Patent Document 1 discloses a clutch device in which coil springs are disposed in concave receiving portions of a pressure plate with spring seats disposed therebetween, and the pressure plate is pressed against a friction plate by means of elastic forces of the coil springs.

PRIOR ART DOCUMENTS

Patent Documents

Patent Document 1: Japanese Patent Application Laid-Open (kokai) No. 2011-153655

However, the clutch device disclosed in Patent Document 1 has the following problem. In a manufacturing process for assembling a clutch device, spring seats are disposed on the bottoms of receiving portions of the pressure plate. However, checking whether or not the spring seats are properly disposed on the bottoms is difficult, and the step of disposing spring seats is time-consuming. Also, the spring seats which have once been disposed in the receiving portions of the pressure plate may fall off or change in attitude before insertion of the coil springs into the receiving portions. In the case where the spring seats have fallen off the receiving portions of the pressure plate, an operation of redisposing the spring seats becomes necessary. In the case where the attitudes of the spring seats in the receiving portions have changed, an operation of readjusting their attitudes becomes necessary. Therefore, the conventional clutch device has a problem that the process of manufacturing the clutch device is troublesome.

The present invention was accomplished in order to solve the above-described problem, and its object is to provide a clutch device which facilitates an operation of checking whether or not spring seats have been properly disposed in receiving portions of a pressure plate and effectively prevents falling off or a change in attitude of the spring seats once disposed in the receiving portions, thereby reducing the labor required for manufacture.

SUMMARY OF THE INVENTION

In order to achieve the above-described object, the present invention provides the clutch device of claim 1. The clutch device is adapted to transfer rotational drive force from a drive shaft to a driven shaft and interrupt the transfer. The clutch device is characterized by comprising:

a clutch hub coupled with the driven shaft and holding a clutch plate which is disposed to face a friction plate rotationally driven by the drive shaft;

a pressure plate which has a concave receiving portion, which can move toward and away from the clutch hub, and which presses the friction plate or the clutch plate;

an elastic member which is disposed in the receiving portion and presses the pressure plate toward the friction plate or the clutch plate; and a spring seat which is disposed between a bottom of the receiving portion and the elastic member and has two plate-shaped arms which can elastically deform so as to separate from each other and approach each other, wherein the spring seat has a protrusion which projects from a periphery of at least one of the two arms, a width of the spring seat as measured across the two arms, including the protrusion, is greater than a width of a space defined by the inner wall surface of the receiving portion, and the pressure plate has a recess which is formed on the inner wall surface of the receiving portion at a position near the bottom and which extends in a direction in which the protrusion projects.

According to the feature of the clutch device of the present invention recited in claim 1, the spring seat disposed in the receiving portion of the pressure plate has two arms which can elastically deform so as to separate from each other and approach each other. The spring seat has a protrusion which projects from the periphery of at least one of the two arms. The width of the spring seat as measured across the two arms, including the protrusion, is greater than the width of the space defined by the inner wall surface of the receiving portion. The receiving portion of the pressure plate which receives the spring seat has a recess which is formed on the inner wall surface of the receiving portion at a position near the bottom and which extends in a direction in which the protrusion projects. Therefore, a worker who assembles the clutch device elastically deforms the spring seat so as to decrease its width, inserts the deformed spring seat into the receiving portion, and releases the deformed spring seat at a position near the bottom of the receiving portion so that the elastic deformation of the spring seat is cancelled partially or completely. As a result, the two arms of the contracted spring seat move away from each other and hit against the inner wall surface of the receiving portion to thereby produce a snapping sound. Also, the protrusion formed on the periphery of the spring seat fits into the recess of the receiving portion. As a result, the worker easily confirms that the spring seat has been properly disposed in the receiving portion of the pressure plate. Also, falling off or a change in attitude of the spring seat once disposed in the receiving portion can be prevented effectively, whereby the labor required for manufacture can be reduced.

A clutch device of the present invention as recited in claim 2 has an additional feature that the width of the protrusion decreases toward its end.

According to the feature of the clutch device of the present invention recited in claim 2, the width of the protrusion decreases toward its end. This configuration enables a worker to easily insert the protrusion into the recess inside the receiving portion.

A clutch device of the present invention as recited in claim 3 has an additional feature that the protrusion is formed on each of the peripheries of the two arms.

According to the feature of the clutch device of the present invention recited in claim 3, the protrusion is formed on each of the peripheries of the two arms. This configuration can more effectively prevent falling off of the spring seat from the receiving portion and a change in its attitude within the receiving portion.

A clutch device of the present invention as recited in claim 4 has an additional feature that the two arms of the spring seat arcuately extend and have respective free ends, and the spring seat has a generally C-like or U-like shape.

According to the feature of the clutch device of the present invention recited in claim 4, the two arms of the spring seat arcuately extend and have respective free ends, and the spring seat has a generally C-like or U-like shape. This configuration allows easy and low-cost manufacture of the spring seat through press working such as punching.

A clutch device of the present invention as recited in claim 5 has an additional feature that the width across the two arms of the spring seat increases toward the free ends.

According to the feature of the clutch device of the present invention recited in claim 5, the width across the two arms of the spring seat increases toward the free ends. By virtue of this configuration, the spring seat can concentrate the elastic force with which the two arms press the inner wall of the receiving portion on the widest portions as measured across the arms. Therefore, the spring seat can be fixed to the receiving portion more effectively.

A clutch device of the present invention as recited in claim 6 has an additional feature that the recess formed in the receiving portion of the pressure plate has a depth which is less than the total thickness of a larger number of spring seats than are disposed in the receiving portion.

According to the feature of the clutch device of the present invention recited in claim 6, the recess formed in the receiving portion of the pressure plate has a depth which is less than the total thickness of a larger number of spring seats than are disposed in the receiving portion. For example, in the case where a single spring seat is disposed in the receiving portion, the depth of the recess is made less than the total thickness of two spring seats, and in the case where two spring seats are disposed in the receiving portion, the depth of the recess is made less than the total thickness of three spring seats. This configuration prevents a worker from disposing an excessive number of spring seats in the receiving portion.

A clutch device of the present invention as recited in claim 7 has an additional feature that the clutch hub has an inclined surface serving as a driven-side cam surface; the pressure plate has an inclined surface serving as a drive-side cam surface and sliding on the driven-side cam surface; and when the driven shaft becomes higher in rotational speed than the drive shaft and a difference in rotational speed is produced between the clutch hub and the pressure plate, the driven-side cam surface and the drive-side cam surface slide and rotate relative to each other so as to move the pressure plate away from the clutch hub, thereby decreasing a pressing force acting on the friction plate and the clutch plate.

According to the feature of the clutch device of the present invention recited in claim 7, the clutch device has a so-called back torque limiter mechanism provided between the clutch hub and the pressure plate. When the driven shaft becomes higher in rotational speed than the drive shaft and a difference in rotational speed is produced between the clutch hub and the pressure plate, the driven-side cam surface and the drive-side cam surface slide and rotate relative to each other so as to move the pressure plate away from the clutch hub, thereby decreasing the pressing force acting on the friction plate and the clutch plate. In a clutch device including such a back torque limiter mechanism, the position of the elastic member changes within the receiving portion as a result of the relative rotation between the pressure plate and the clutch hub. Accordingly, there is a great need for the spring seat. Namely, the present invention can be applied to a clutch device which includes a back torque limiter mechanism and in which the elastic member may move in the receiving portion.

MODE FOR CARRYING OUT THE INVENTION

Figure 1:
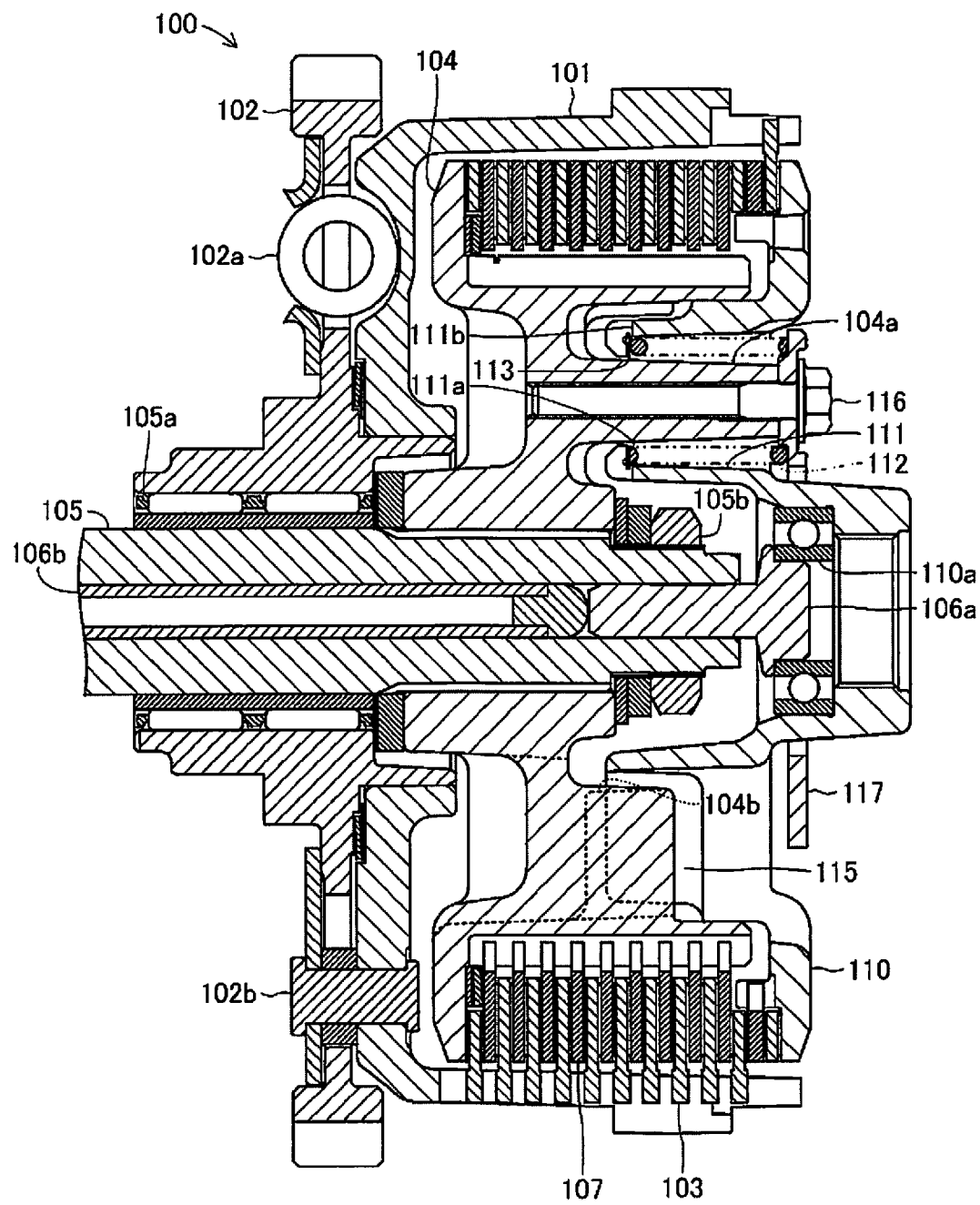
FIG. 1 is a sectional view schematically showing the overall structure of a clutch device according to one embodiment of the present invention.

One embodiment of a clutch device according to the present invention will now be described with reference to the drawings. FIG. 1 is a sectional view schematically showing the overall structure of a clutch device 100 according to the present invention. In each of the drawings which will be referred to herein, some components are shown schematically, such as in an exaggerated manner so as to facilitate an understanding of the present invention. Therefore, the dimensions, dimensional ratios, etc. of the constituent elements may differ from the actual dimensions, dimensional ratios, etc. The clutch device 100 is a mechanical device for transferring drive torque from an engine (not shown), which is the prime mover of a two-wheel vehicle (motorcycle), to a wheel (not shown), which is a driven body, and interrupting the transfer of the drive torque. The clutch device 100 is disposed between the engine and a transmission (not shown).

(Structure of the Clutch Device 100)

The clutch device 100 has a clutch housing 101 formed of an aluminum alloy. The clutch housing 101 is a member which is formed into the shape of a cylindrical tube with a bottom and which partially constitutes the enclosure of the clutch device 100. An input gear 102 is fixed, through a torque damper 102a, to the left-hand side surface of the clutch housing 101 as viewed in FIG. 1 by means of rivets 102b. The input gear 102 is in engagement with an unillustrated drive gear which is driven and rotated by an engine. Thus, the input gear 102 is driven and rotated by the drive gear. A plurality (11 in the present embodiment) of friction plates 103 are held on the inner circumferential surface of the clutch housing 101 through spline engagement so that the friction plates 103 can move in the axial direction of the clutch housing 101 and can rotate together with the clutch housing 101.

The friction plates 103 are flat annular components which are pressed against clutch plates 107, which will be described later. The friction plates 103 are formed by punching a thin SPCC (cold-rolled steel plate) into an annular shape. Unillustrated oil grooves having a depth of several μm to several tens of pm are formed on opposite side surfaces (the front and back surfaces) of each friction plate 103 so as to retain clutch oil. Surface hardening treatment is performed on the opposite side surfaces (the front and back surfaces) of each friction plate 103 in order to enhance wear resistance.

A clutch hub 104 having a generally flange shape is disposed inside the clutch housing 101 concentrically with the clutch housing 101. A large number of spline grooves extending in the axial direction of the clutch hub 104 are formed on the inner circumferential surface of the clutch hub 104. A shaft 105 is spline-engaged with the spline grooves. One end portion (the left end portion in FIG. 1) of the shaft 105, which is hollow at its center, rotatably supports the input gear 102 and the clutch housing 101 through a needle bearing 105a, and fixedly supports, through a nut 105b, the clutch hub 104 which is spline-engaged with that end portion. Thus, the clutch hub 104 rotates together with the shaft 105. The one end portion (the left end portion in FIG. 1) of the shaft 105 is connected to the unillustrated transmission of the two-wheel vehicle.

A pushing member 106a is provided at one end (the right end) of the hollow space of the shaft 105, and a push rod 106b is provided adjacent to the pushing member 106a such that the push rod 106b extends in the axial direction of the shaft 105. The pushing member 106a is a rodlike member extending in the axial direction of the shaft 105. One end portion (the left end portion in FIG. 1) of the pushing member 106a is slidably received in the hollow space of the shaft 105, and the other end portion (the right end portion in FIG. 1) of the pushing member 106a is connected to a release bearing 110a provided on the pressure plate 110. An end portion of the push rod 106b located at one end (the left end in FIG. 1) of the shaft 105 is connected to an unillustrated clutch operating lever of the two-wheel vehicle. Therefore, when the clutch operating lever is operated, the push rod 106b pushes the pushing member 106a while sliding within the hollow space of the shaft 105 in the axial direction of the shaft 105.

A plurality (10 in the present embodiment) of clutch plates 107 are held on the outer circumferential surface of the clutch hub 104 by spline engagement such that the clutch plates 107 and the friction plates 103 are alternatingly arranged and such that the clutch plates 107 can move in the axial direction of the clutch hub 104 and can rotate together with the clutch hub 104. The clutch plates 107 are flat annular components which are pressed against the above-described friction plates 103. The clutch plates 107 are formed by punching a thin SPCC (cold-rolled steel plate) into an annular shape. Each clutch plate 107 has unillustrated friction members and unillustrated oil grooves on opposite side surfaces (the front and back surfaces) thereof. The friction members are formed of a plurality of pieces of paper. Each of the oil grooves is formed between the adjacent friction members. Each clutch plate 107 has a spline (internal teeth) which is formed along the inner circumference thereof for spline engagement with the clutch hub 104.

Three tubular support columns 104a and three driven-side cam surfaces 104b are formed on a radially inner portion of the clutch hub 104. The tubular support columns 104a and the driven-side cam surfaces 104b project toward the pressure plate 110 (the right-hand side in FIG. 1). The three tubular support columns 104a are cylindrical tubular portions extending in a columnar shape so as to support the pressure plate 110. Each tubular support column 104a has an internal thread formed on the inner circumference thereof. Each of the three driven-side cam surfaces 104b is formed by an inclined surface, the amount of projection of which toward the pressure plate 110 (the right-hand side in FIG. 1) gradually increases in the circumferential direction of the clutch hub 104. In FIG. 1, one of the three driven-side cam surfaces 104b is shown by a broken line.

Figure 2:
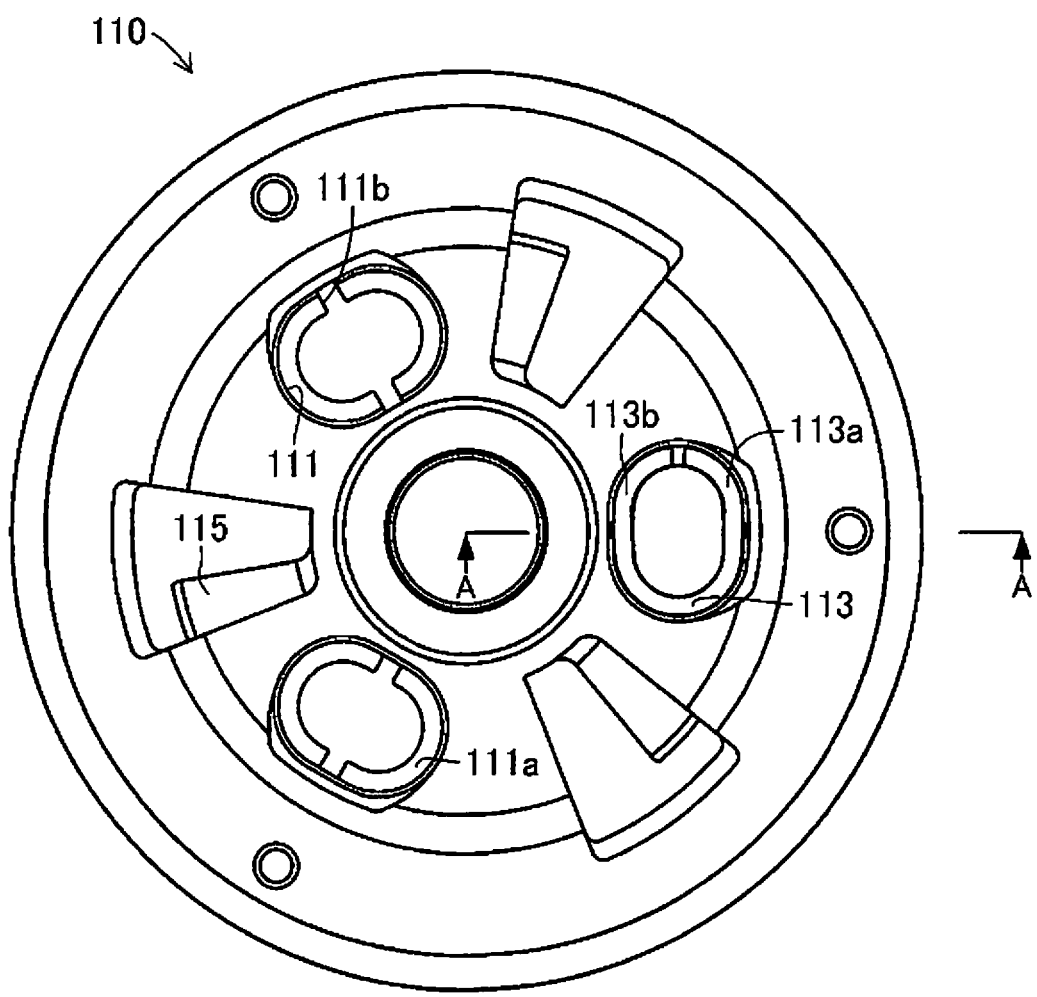
FIG. 2 is a plan view schematically showing the exterior of a pressure plate incorporated into the clutch device shown in FIG. 1.
Figure 3:
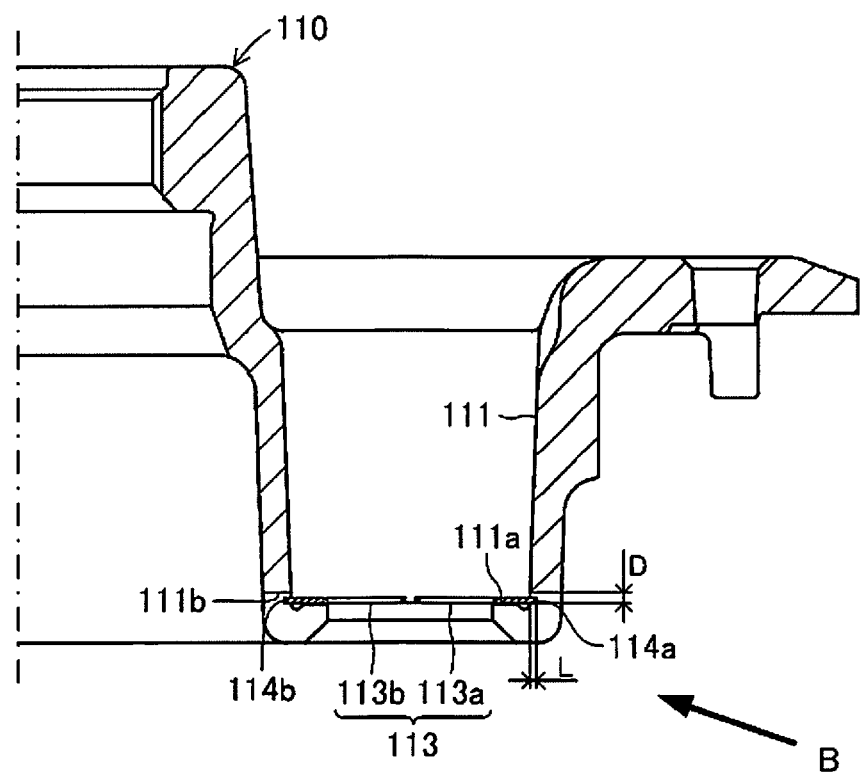
FIG. 3 is a sectional view of the pressure plate taken along line A-A of FIG. 2.
Figure 4:
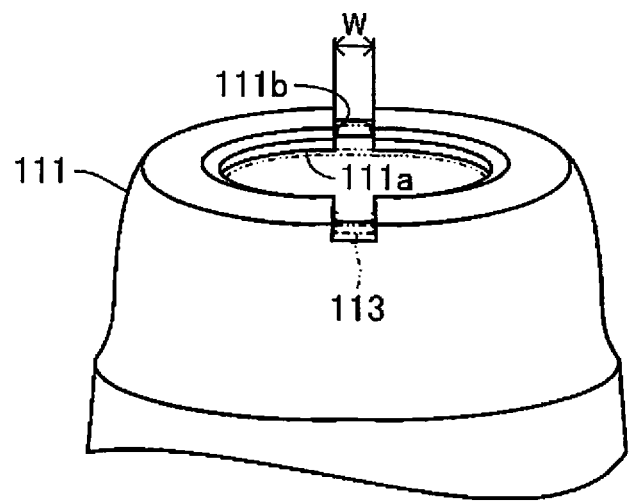
FIG. 4 is a perspective view of a receiving portion as viewed in the direction of arrow B shown FIG. 3.

The pressure plate 110 is a component for pressing one of the friction plates 103 to thereby bring the friction plates 103 and the clutch plates 107 into a tightly coupled or engaged state. The pressure plate 110 is fabricated by forming an aluminum material into the shape of a disc having an outer diameter approximately equal to the outer diameter of the clutch plates 107. As shown in FIGS. 2 to 4, the pressure plate 110 has three receiving portions 111 which are formed on one side surface thereof at predetermined intervals in the circumferential direction and each of which defines an oval hole (an oval space having an oval transverse cross section). Each receiving portion 111 is a tubular portion projecting toward the clutch hub 104 (the left-hand side in FIG. 1). An end portion of each receiving portion 111 located on the side toward the clutch hub 104 extends radially inward so as to form an annular bottom 111a of the receiving portion 111.

Groove-like recesses 111b are formed on the inner wall surface of each receiving portion 111 at a position near the bottom 111a and at the center of the receiving portion 111 with respect to the circumferential direction of the pressure plate 110. The recesses 111b extend through the receiving portion 111 in the radial direction of the pressure plate 110. The recesses 111b receive protrusions 114a and 114b of a spring seat 113 which will be described later. Each recess 111b has a width W and a depth D which correspond to the width and thickness of the protrusions 114a and 114b, respectively. More specifically, each recess 111b has a width W slightly greater than the width of the protrusions 114a and 114b and a depth D slightly greater than the thickness of the protrusions 114a and 114b.

In this case, it is preferred that the width W be 0.1 mm to several millimeters greater than the width of the protrusions 114a and 114b. The depth D of each recess 111b refers to a distance between the bottom 111a of the receiving portion 111 and the bottom of the recess 111b, which bottom is located on the upper side of the recess 111b in FIG. 3. In the present embodiment, the depth D of each recess 111b is less than twice the thickness of a single spring seat 113 which is disposed in the receiving portion 111. FIG. 2 shows a state in which the spring seat 113 is disposed only in the right-hand side receiving portion 111 among the three receiving portions 111. In FIG. 4, the spring seat 113 disposed in the receiving portion 111 is shown by a line comprising alternating one long and two short dashes.

The tubular support columns 104a of the clutch hub 104 are disposed in the receiving portions 111 such that the tubular support columns 104a extend therethrough. The clutch springs 112 and the spring seats 113 are provided to surround the corresponding tubular support columns 104a. Each of the clutch springs 112 is an elastic member which is disposed in each receiving portion 111 and produces an elastic force for pressing the pressure plate 110 toward the clutch hub 104. Each of the clutch springs 112 is a coil spring formed by winding spring steel wire into a spiral shape. Each of the spring seats 113 is a metal plate which is disposed in each receiving portion 111 between the bottom 111a and the clutch spring 112. In the present embodiment, each spring seat 113 is formed of spring steel plate having a thickness of 0.5 mm.

Figure 5:
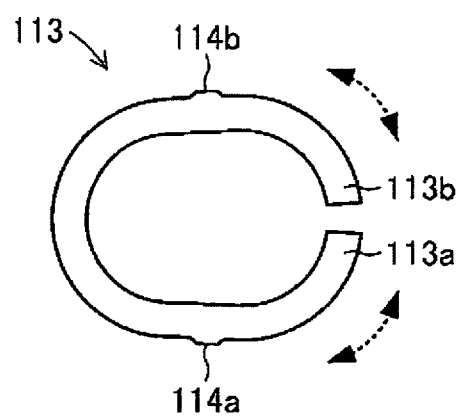
FIG. 5 is a plan view schematically showing the exterior of a spring seat incorporated into the clutch device shown in FIG. 1.

As shown in FIG. 5 in detail, each spring seat 113 has two plate-shaped arms 113a and 113b integrally formed with each other such that the two arms 113a and 113b can elastically deform to separate away from each other (see the broken line arrows in FIG. 5) and approach each other (see the broken line arrows in FIG. 5). More specifically, the two arms 113a and 113b of the spring seat 113 are connected together at their ends on one side of the spring seat 113 (on the left-hand side in FIG. 5). The ends of the two arms 113a and 113b located on the other side of the spring seat 113 (on the right-hand side in FIG. 5) are free ends. Therefore, the spring seat 113 has a generally C-like shape in a plan view, as a whole, which shape corresponds to the shape of the bottom 111a of each receiving portion 111. The spring seat 113 is formed such that the width across the two arms 113a and 113b increases toward their free ends. The two arms 113a and 113b have protrusions 114a and 114b which project outward from their peripheries at symmetric positions.

The protrusions 114a and 114b are portions which fit into the recesses 111b of the receiving portion 111 and come into engagement with the inner wall portion of the receiving portion 111, thereby preventing the spring seat 113 from falling off the receiving portion 111 and preventing a change in the attitude of the spring seat 113. The protrusions 114a and 114b have a generally trapezoidal shape, i.e., the width of the protrusions 114a and 114b at their distal ends is smaller than that on the side toward the arms 113a and 113b. Accordingly, the amount of projection of the protrusions 114a and 114b from the peripheries of the arms 113a and 113b is set to an amount sufficient for engagement with the inner wall portion of the receiving portion 111. Specifically, the amount of projection of the protrusions 114a and 114b is determined such that the amount L by which the protrusions 114a and 114b are engaged with the inner wall portion of the receiving portion 111 falls within a range of 0.1 mm to 1.0 mm. In the present embodiment, the protrusions 114a and 114b project from the arms 113a and 113b over a length of about 3 mm. The spring seats are manufactured by press working such as punching.

The pressure plate 110 has drive-side cam surfaces 115 which are formed on the surface thereof on the side toward the clutch hub 104 such that each drive-side cam surface 115 is located between adjacent receiving portions 111. The drive-side cam surfaces 115 project toward the clutch hub 104 (the left-hand side in FIG. 1). These three drive-side cam surfaces 115 slide on the driven-side cam surfaces 104b of the clutch hub 104. Each of the drive-side cam surfaces 115 is formed by an inclined surface which projects toward the clutch hub 104 (the left-hand side in FIG. 1) by an amount which gradually increases in the circumferential direction of the pressure plate 110.

The pressure plate 110 is fixed to the clutch hub 104 through use of three attachment bolts 116. Specifically, in a state in which the tubular support columns 104a of the clutch hub 104, the spring seats 113, and the clutch springs 112 are disposed in the receiving portions 111, the attachment bolts 116 are screwed into the tubular support column 104a with a stopper member 117 disposed therebetween. The stopper member 117 is a metallic member for restricting displacement of the pressure plate 110 in a direction away from the clutch hub 104. It has a generally triangular shape in plan view. As a result, the pressure plate 110 is movably attached such that it can approach the clutch hub 104 and move away from the clutch hub 104.

A predetermined amount of clutch oil (not shown) is charged into the clutch device 100. The clutch oil is supplied mainly to the spaces between the friction plates 103 and the clutch plates 107 so as to absorb the frictional heat produced therebetween and to prevent wear of the friction materials. Namely, this clutch device 100 is a so-called wet-type multi-plate friction clutch.

(Assembly of the Clutch Device 100)

Next, assembly of the pressure plate 110 and the spring seats 113 in the clutch device 100 having the above-described structure will be described. A worker who assembles the clutch device 100 prepares an assembly (semi-manufactured product) in which the friction plates 103 and the clutch plates 107 have been attached to the clutch housing 101 and the clutch hub 104, respectively, through predetermined working steps. The worker also prepares the pressure plate 110, the clutch springs 112, the spring seats 113, the attachment bolts 116, and the stopper member 117.

Next, the worker disposes the spring seats 113 in the receiving portions 111 of the pressure plate 110. Specifically, the worker inserts the tubular support columns 104a of the clutch hub 104 into the receiving portions 111 of the pressure plate 110 so that the pressure plate 110 covers the clutch hub 104. Next, the worker elastically deforms the arms 113a and 113b of each spring seat 113 manually or using a tool such as a pair of pliers such that the arms 113a and 113b approach each other, and the spring seat 113 is contracted in the width-wise direction thereof. The worker inserts the contracted spring seat 113 into one of the receiving portions 111 of the pressure plate 110. In this case, the worker elastically deforms the spring seat 113 in the contracting direction until the width of the spring seat 113 measured at the protrusions 114a and 114b becomes smaller than the width of the oval space defined by the inner wall surface of the receiving portion 111.

Next, the worker inserts the spring seat 113 into the receiving portion 111 such that the spring seat 113 reaches a position near the bottom 111a thereof, and then cancels the state in which the spring seat 113 is held by the tool. As a result, the spring seat 113 attempts to restore its original shape, i.e., to move the arms 113a and 113b so as to separate them from each other. In the case where the protrusions 114a and 114b formed on the arms 113a and 113b of the spring seat 113 face the recesses 111b formed in the inner wall portion of the receiving portion 111, the protrusions 114a and 114b fit into the recesses 111b, and produce a snapping sound. Namely, when the protrusions 114a and 114b fit into the recesses 111b, the arms 113a and 113b of the spring seat 113 hit against the inner wall portion of the receiving portion 111, whereby a snapping sound is produced.

In contrast, in the case where the positions of the protrusions 114a and 114b deviate from those of the recesses 111b formed in the inner wall portion of the receiving portion 111, the protrusions 114a and 114b come into contact with the inner wall portion of the receiving portion 111, and the arms 113a and 113b do not hit against the inner wall portion of the receiving portion 111. Therefore, a sound which can be heard clearly is not generated. Accordingly, when the worker cannot hear the sound produced as a result of fitting of the protrusions 114a and 114b into the recesses 111b, the worker determines that the spring seat 110 is not properly disposed in the receiving portion 111, and the worker changes the position and/or orientation of the spring seat 113 in the receiving portion 111 such that the protrusions 114a and 114b fit into the recesses 111b.

When the positions of the protrusions 114a and 114b coincide with those of the recesses 111b as a result of the above-described operation, the protrusions 114a and 114b fit into the recesses 111b. As a result, the arms 113a and 113b hit against the inner wall portion of the receiving portion 111, and produce a snapping sound. Namely, the sound produced when the arms 113a and 113b of the spring seat 113 hit against the inner wall portion of the receiving portion 111 allows the worker to confirm that the protrusions 114a and 114b of the spring seat 113 have fit into the recesses 111b and the spring seat 113 has been attached to the receiving portion 111. The spring seat 113 may be configured such that when the protrusions 114a and 114b fit into the recesses 111b, the spring seat 113 restores its original shape in which the elastic deformation of the spring seat 113 is cancelled completely, or it may be configured such that when the protrusions 114a and 114b fit into the recesses 111b, the spring seat 113 maintains a portion of the elastic deformation thereof. The latter configuration, i.e., a configuration of the spring seat 113 in which the spring seat 113 partially maintains its elastic deformation even after the protrusions 114a and 114b have fit into the recesses 111b is preferred because the attached state of the spring seat 113 can be maintained more stably.

The depth D of the recesses 111b formed in the inner wall portion of the receiving portion 111 is less than twice the thickness of the spring seat 113. Therefore, a worker cannot dispose two or more spring seats 113 in a single receiving portion 111. Thus, it is possible to prevent occurrence of erroneous assembly in which an excessive number of spring seats 113 are disposed in each receiving portion 111. Also, each of the protrusions 114a and 114b of the spring seat 113 is formed such that the width at the distal end is smaller than the width on the side toward the arm 113a or 113b. Therefore, the worker can easily fit the protrusions 114a and 114b of the spring seat 113 into the recesses 111b of the receiving portion 111. In addition, the spring seat 113 is formed such that the width across the two arms 113a and 113b increases toward the free ends thereof. By virtue of this configuration, the spring seat 113 can concentrate the force with which the two arms 113a and 113b press the inner wall of the receiving portion 111 on the widest portions as measured across the arms 113a and 113b. Therefore, the spring seat 113 can be fixed to the receiving portion 111 more effectively.

Next, the worker disposes the clutch springs 112 in the receiving portions 111 in which the spring seats 113 have been disposed and places the stopper member 117 on the clutch springs 112. Next, the worker passes the attachment bolts 116 through the stopper member 117 and screws them into the tubular support columns 104a. As a result, the pressure plate 110 is assembled such that it is pressed against the clutch hub 104 and can move toward and away from the clutch hub 104. In the step of installing the clutch springs 112, the step of installing the stopper member 117, and the step of screwing the attachment bolts 116, since the protrusions 114a and 114b of the spring seat 113 are located in the recesses 111b of the receiving portion 111, the spring seat 113 neither falls off from the receiving portion 111 nor changes in position or attitude. The worker then completes the clutch device 100 through the remaining manufacturing steps. Since the remaining manufacturing steps for completing the clutch device 100 do not relate directly to the present invention, their description is omitted.

(Operation of the Clutch Device 100)

Next, operation of the clutch device 100 having the above-described structure will be described. As described above, the clutch device 100 is disposed between the engine and the transmission of a vehicle. In accordance with operation of the clutch operating lever by a driver of the vehicle, the clutch device transfers drive force from the engine to the transmission or interrupts the transfer.

Namely, when the driver (not shown) of the vehicle operates the clutch operating lever (not shown) to thereby retract the push rod 106b (move the push rod 106b toward the left-hand side in FIG. 1), the pushing member 106a becomes unable to press the release bearing 110a. As a result, the pressure plate 110 presses the corresponding friction plate 103 by making use of the elastic force of the clutch springs 112. Thus, the friction plates 103 and the clutch plates 107 are pressed against one another while moving toward the clutch hub 104, whereby the friction plates 103 and the clutch plates 107 are frictionally coupled together. In this case, as a result of the camming action of the driven-side cam surfaces 104b formed on the clutch hub 104 and the drive-side cam surfaces 115 formed on the pressure plate 110, a strong pressing force acts on the friction plates 103 and the clutch plates 107, whereby the friction plates 103 and the clutch plates 107 are tightly coupled together. As a result, the drive force transmitted from the engine to the input gear 102 is transferred to the transmission via the friction plates 103, the clutch plates 107, the clutch hub 104, and the shaft 105.

When the driver of the vehicle operates the clutch lever (not shown) to thereby advance the push rod 106b (move the push rod 106b toward the right-hand side in FIG. 1), the distal end of the pushing member 106a pushes the release bearing 110a. As a result, the pressure plate 110 moves rightward in FIG. 1 against the elastic force of the clutch springs 112, i.e., it moves away from the friction plate 103. Thus, the friction plates 103 and the clutch plates 107 are released from a state in which they are pressed and coupled together while moving toward the pressure plate 110, whereby the friction plates 103 and the clutch plates 107 are disengaged from one another. Consequently, the transfer of drive force from the friction plates 103 to the clutch plates 107 is stopped, whereby the drive force transmitted from the engine to the input gear 102 is prevented from being transferred to the transmission.

When the rotational speed on the transmission side becomes higher than that of the input gear 102, i.e., when a back torque acts on the clutch device 100, as a result of the camming action of the driven-side cam surfaces 104b formed on the clutch hub 104 and the drive-side cam surfaces 115 formed on the pressure plate 110, the pressure plate 110 moves away from the clutch hub 104 while rotating in relation thereto, as a result of which the pressing force decreases. In this case, the clutch springs 112 slide on the spring seats 113 in the receiving portions 111 of the pressure plate 110. Therefore, falling or deformation, such as twisting, of the clutch springs 112 can be prevented effectively. Also, since both the clutch springs 112 and the spring seats 113 are formed of spring steel, it is possible to prevent damage to the clutch springs 112 and the spring seats 113, which damage would otherwise occur when only one of the two members wears locally and bites into the other member.

When the pressure plate 110 rotates in relation to the clutch hub 104, the friction plates 103 and the clutch plates 107 are released from a state in which they are pressed and coupled together, whereby the friction plates 103 and the clutch plates 107 are disengaged from one another. Consequently, the transfer of drive force from the friction plates 103 to the clutch plates 107 is stopped, whereby the drive force transmitted from the engine to the input gear 102 is prevented from being transferred to the transmission.

As can be understood from the above-described description of the operation of the clutch device 100, in the above-described embodiment, the spring seat 113 disposed in each receiving portion 111 of the pressure plate 110 has the two arms 113a and 113b which are integrally formed with each other such that the arms 113a and 113b can elastically deform to separate from each other and approach each other. The spring seat 113 has the protrusions 114a and 114b which project from the peripheries of the two arms 113a and 113b. The width of the spring seat 113 measured across the arms 113a and 113b including the protrusions 114a and 114b is wider than the width of the oval space defined by the inner wall surface of the receiving portion 111. Each receiving portion 111 of the pressure plate 110 which receives the spring seat 113 has the recesses 111b which are formed on the inner wall surface at a position near the bottom 111a. The recesses 111b extend in the projecting directions of the protrusions 114a and 114b. Therefore, a worker who assembles the clutch device 100 elastically deforms the spring seat 113 so as to decrease its width, inserts the deformed spring seat 113 into the receiving portion 111, and releases the deformed spring seat 113 at a position near the bottom 111a of the receiving portion 111. As a result, the two arms 113a and 113b of the contracted spring seat 113 move away from each other and hit against the inner wall surface of the receiving portion 111 to produce a snapping sound. Also, the protrusions 114a and 114b formed on the periphery of the spring seat 113 fit into the recesses 111b of the receiving portion 111. As a result, the worker easily confirms that the spring seat 113 has been properly disposed in the receiving portion 111 of the pressure plate 110. Also, falling off or a change in attitude of the spring seat 113 once disposed in the receiving portion 111 can be prevented effectively, whereby the labor required for manufacture can be reduced.

The present invention is not limited to the above-described embodiment, and it may be modified in various ways without departing from the scope of the present invention. In the modifications described below, structural portions identical with those of the clutch device 100 according to the above-described embodiment are denoted by the same reference numerals as those used for the clutch device 100, and their descriptions will not be repeated.

In the above-described embodiment, the clutch springs 112 are coil springs. However, the clutch springs 112 are not limited to coil springs so long as the clutch springs 112 are elastic members which are disposed in each receiving portion 111 of the pressure plate 110 and which produce via the pressure plate 110 an elastic force for tightly coupling the friction plates 103 and the clutch plates 107. Namely, the clutch springs 112 correspond to the elastic member in the present invention. Therefore, the elastic member may be an elastic member other than a coil spring, such as a plate spring. Alternatively, the function of the clutch springs 112 may be realized through use of hydraulic pressure.

In the above-described embodiment, the spring seats 113 are formed of spring steel. However, the material of the spring seats 113 is not limited to that used in the above-described embodiment so long as the spring seats 113 are formed of a material which provides sufficient durability when the spring seats 113 are used together with the clutch springs 112. For example, the spring seats 113 may be formed of a metal material (stainless steel or aluminum) other than spring steel or a resin material.

In the above-described embodiment, both of the two arms 113a and 113b of the spring seat 113 have the protrusions 114a and 114b. However, it is sufficient to form such a protrusion on only one of the two arms 113a and 113b. Although no limitation is imposed on the positions of the protrusions 114a and 114b, it is preferred that the protrusions 114a and 114b be provided at the centers of the arms 113a and 113b as in the above-described embodiment so that the orientation of the spring seat 113 is not limited to a single orientation, and the process of installing the spring seat 113 is facilitated.

Figure 6:
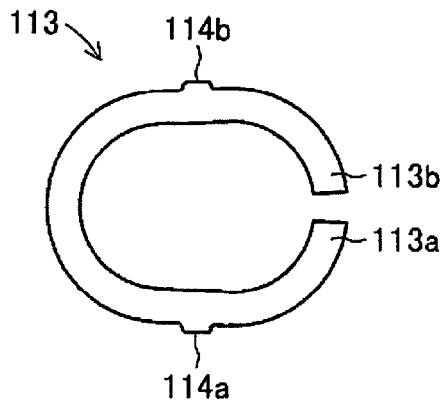
FIGS. 6(a) through 6(c) are plan views schematically showing the exteriors of spring seats according to modifications of the present invention.
Figure 6:
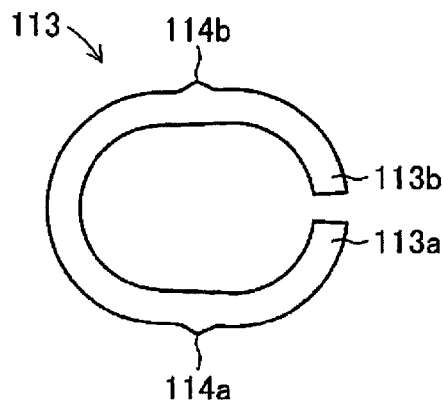
Figure 6:
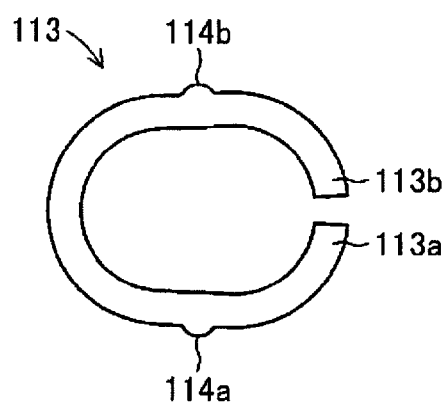

In the above-described embodiment, the protrusions 114a and 114b have a trapezoidal shape. However, the shape of the protrusions 114a and 114b is not limited to that in the above-described embodiment so long as the protrusions 114a and 114b bulge from the arms 113a and 113b. For example, the protrusions 114a and 114b may have a rectangular shape as shown in FIG. 6(a), a triangular shape as shown in FIG. 6(b), or a circular shape as shown in FIG. 6(c).

Figure 7:
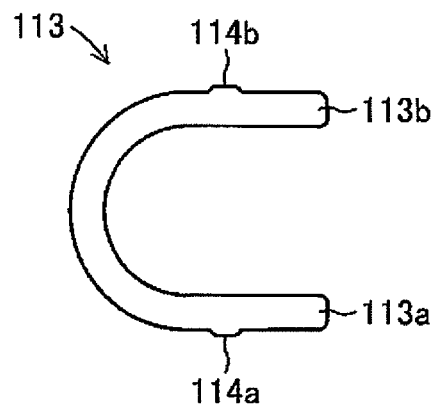
FIG. 7 is a plan view schematically showing the exterior of a spring seat according to another modification of the present invention.

In the above-described embodiment, each spring seat 113 is formed to have a generally C-like shape in plan view. However, the shape of the spring seat 113 is not limited to that in the above-described embodiment so long as the spring seat 113 has two integrally formed arms 113a and 113b which have a plate-like shape and which can elastically deform to move away from each other and approach each other, and so long as at least one protrusion 114a or 114b is formed on the periphery of at least one of the two arms 113a and 113b. For example, as shown in FIG. 7, the spring seat 113 may be formed to have a generally U-like shape in plan view.

In the above-described embodiment, each spring seat 113 is formed such that its width increases toward the free ends (on the right-hand side in FIG. 5) of the arms 113a and 113b. However, as shown in FIG. 7, each spring seat 113 may be formed such that arm 113a and arm 113b become parallel to each other.

In the above-described embodiment, the depth D of the recesses 111b formed in the inner wall portion of each receiving portion 111 is smaller than twice the thickness of the spring seat 113. However, the depth D of the recesses 111b may be freely set in accordance with the number of spring seats 113 disposed in the receiving portions 111. For example, in the case where two spring seats 113 are disposed in each receiving portion 111, the depth D of the recesses 111b is set to a depth less than three times the thickness of the spring seat 113. All that is required is that the depth D of the recesses 111b be equal to or greater than the thickness of the spring seat(s) 113 disposed in each receiving portion 111. Therefore, in the case where a single spring seat 113 is disposed in each receiving portion 111, the depth D of the recesses 111b may be set to a depth equal to or greater than twice the thickness of the spring seat 113.

The recesses 111b formed in the inner wall portion of each receiving portion 111 are recesses which are formed in the bottom 111a of the receiving portion 111 such that the recesses extend through the receiving portion 111 in the radial direction of the pressure plate 110. However, the recesses 111b may have an arbitrary length so long as the distance between the outer ends of the two recesses 111b measured in the radial direction of the pressure plate 110 is greater than the width of the spring seat 113 measured at the protrusions 114a and 114b. All that is required is that the recesses 111b be formed on the inner wall surface of the receiving portion 111, and the recesses 111b are not required to extend through the bottom 111a toward the clutch hub 104 side as in the above-described embodiment.

In the above-described embodiment, the clutch device 100 has a so-called back torque limiter mechanism including the driven-side cam surfaces 104b and the drive-side cam surfaces 115 which are formed on the clutch hub 104 and the pressure plate 110, respectively, and which slidably move relative to each other to achieve a camming action. However, the spring seats 113 and the pressure plate 110 according to the present invention may be applied to a clutch device 100 which does not include a back torque limiter mechanism composed of the driven-side cam surfaces 104b and the drive-side cam surfaces 115.

In the above-described embodiment, the pressure plate 110 is configured to press the friction plates 103. However, the pressure plate 110 may be configured freely so long as the pressure plate 110 can press the friction plates 103 or the clutch plates 107 for tight coupling between the friction plates 103 and the clutch plates 107. Namely, the pressure plate 110 may be configured to press the clutch plates 107. For example, the positions of the friction plates 103 and the positions of the clutch plates 107 in the above-described embodiment may be exchanged such that the pressure plate 110 presses the clutch plates 107.

DESCRIPTION OF SYMBOLS

L: engagement amount; W: recess width; D: recess depth;
100: clutch device; 101: clutch housing; 102: input gear; 102*a*: torque damper; 102*b*: rivet; 103: friction plate; 104: clutch hub; 104*a*: tubular support column; 104*b*: driven-side cam surface; 105: shaft; 105*a*: needle bearing; 105*b*: nut; 106*a*: pushing member; 106*b*: push rod; 107: clutch plate;
110: pressure plate; 110*a*: release bearing; 111: receiving portion; 111*a*: bottom; 111*b*: recess; 112: clutch spring; 113: spring seat; 113*a*, 113*b*: arm; 114*a*, 114*b*: protrusion; 115: drive-side cam surface; 116: attachment bolt; 117: stopper member.

The invention claimed is:

1. A clutch device which transfers rotational drive force from a drive shaft to a driven shaft and interrupts the transfer, comprising:
   a clutch hub which is coupled with the driven shaft and holds a clutch plate which faces a friction plate rotationally driven by the drive shaft;
   a pressure plate which has a concave receiving portion and which can move toward and away from the clutch hub and which presses the friction plate or the clutch plate;
   an elastic member which is disposed in the receiving portion and presses the pressure plate toward the friction plate or the clutch plate; and
   at least one spring seat which is disposed between a bottom of the receiving portion and the elastic member and has two plate-shaped arms which can elastically deform so as to separate from and approach each other, wherein
   each spring seat has a first protrusion which projects from a periphery of one of its two arms,
   each spring seat has a width as measured across its two arms, including the first protrusion, which is greater than a width of a space defined by an inner wall surface of the receiving portion, and
   the pressure plate has a recess which is formed on the inner wall surface of the receiving portion at a position near the bottom and which extends in a direction in which the first protrusion projects.

2. A clutch device as claimed in claim 1, wherein the first protrusion has a width which decreases toward its end.

3. A clutch device as claimed in claim 1, wherein each spring seat has a second protrusion which is formed on and projects from a periphery of the other of the two arms.

4. A clutch device as claimed in claim 1, wherein each of the arms of each spring seat extends arcuately and has a free end, and each spring seat has a generally C-like or U-like shape.

5. A clutch device as claimed in claim 4, wherein each spring seat has a width as measured across its two arms which increases toward the free ends of the arms.

6. A clutch device as claimed in claim 1, wherein n (wherein n is an integer greater) of the spring seats are disposed in the receiving portion of the pressure plate, and the recess in the receiving portion has a depth which is less than the total thickness of (n +1) of the spring seats.

7. A clutch device as claimed in claim 1, wherein:
   the clutch hub has an inclined surface serving as a driven-side cam surface;
   the pressure plate has an inclined surface which serves as a drive-side cam surface and slides on the driven-side cam surface; and
   when the driven shaft becomes higher in rotational speed than the drive shaft and a difference in rotational speed develops between the clutch hub and the pressure plate, the driven-side cam surface and the drive-side cam surface slide and rotate relative to each other so as to move the pressure plate away from the clutch hub and thereby decrease a pressing force acting on the friction plate and the clutch plate.

* * * * *